(12) United States Patent
Shen

(10) Patent No.: US 9,761,105 B1
(45) Date of Patent: Sep. 12, 2017

(54) CONTROL SYSTEM PROVIDING A REAL-TIME REMOTE ALARM

(71) Applicant: I-Ting Shen, Tainan (TW)

(72) Inventor: I-Ting Shen, Tainan (TW)

(*) Notice: Subject to any disclaimer, the term of this patent is extended or adjusted under 35 U.S.C. 154(b) by 0 days.

(21) Appl. No.: 15/182,691

(22) Filed: Jun. 15, 2016

(30) Foreign Application Priority Data

May 17, 2016 (TW) .............................. 105115229 A

(51) Int. Cl.
*G08B 21/00* (2006.01)
*G08B 13/24* (2006.01)
*G07C 9/00* (2006.01)

(52) U.S. Cl.
CPC ..... *G08B 13/2491* (2013.01); *G07C 9/00126* (2013.01); *G07C 9/00309* (2013.01); *G07C 9/00571* (2013.01)

(58) Field of Classification Search
CPC ...................... G08B 13/2491; G07C 9/009126
USPC ....................................................... 340/541
See application file for complete search history.

(56) References Cited

U.S. PATENT DOCUMENTS

| 2002/0057342 A1* | 5/2002 | Yoshiyama | G08B 13/19634 348/153 |
| 2003/0095185 A1* | 5/2003 | Naifeh | H04N 7/185 348/156 |
| 2006/0049940 A1* | 3/2006 | Matsuhira | G08B 13/19645 340/541 |
| 2008/0061970 A1* | 3/2008 | Imai | G08B 13/08 340/545.1 |
| 2009/0091618 A1* | 4/2009 | Anderson | B60R 1/00 348/143 |
| 2013/0021473 A1* | 1/2013 | Yeh | G08B 29/046 348/143 |

\* cited by examiner

*Primary Examiner* — Mark Rushing
(74) *Attorney, Agent, or Firm* — Alan D. Kamrath; Kamrath IP Lawfirm, P.A.

(57) ABSTRACT

A control system includes a control module (34), a control device (20) mounted to a door (12) and controllable by the control module (34), and a manager mobile device (54) operable to connect with the control module (34) to obtain management authority to access to the door (12). The control device (20) includes a latch (24) for retaining the door (12) in a closed position. A vibration detecting unit (66) is mounted to the door (12) or the control device (20) and is electrically connected to the control module (34). When the vibration detecting unit (66) detects vibrations of the door (12) or the control device (20), the manager mobile device (54) is activated, and the image of the outside of the door (12) is transmitted to the manager mobile device (54), such that the manager can immediately know the situation outside the door (12).

9 Claims, 2 Drawing Sheets

CONTROL SYSTEM PROVIDING A REAL-TIME REMOTE ALARM

BACKGROUND

The present invention relates to a control system providing a real-time remote alarm and, more particularly, to a control system using the Internet, a mobile communication network (such as 3G or 4G mobile communication network), or a local area network to permit communication between a mobile device (such as a cell phone or a tablet) with the control system, thereby obtaining real-time information of the control system.

There are many tricks to compromise conventional mechanical locks that have been well developed. In an approach to enhance the anti-burglar effect, a sensor device has been provided between a door and a door frame to cooperate with an anti-burglar system. The anti-burglar system, if not deactivated, will be activated when the door is opened. However, currently available anti-burglar systems merely provide audio alarms, such that the owner of a house cannot know the situation (such as a burglar is destroying the door or the door lock of the house) when on one is home. Furthermore, the anti-burglar system cannot generate any alarm when the anti-burglar system is not activated; namely, the alarm device is useless when the burglar is destroying the door or the door lock. Although the burglar might give up due to the anti-burglar system, the door and/or the door lock could have been destroyed, causing the expense for replacing the door and/or the door lock.

BRIEF SUMMARY

A control system according to the present invention includes a door movable between a closed position and an open position. A control device is mounted to the door and includes a latch. The control device is controllable to be in an open state or a locked state. The latch is movable from a latching position to an unlatching position when the control device is in the open state. The latch is not movable from the latching position to the unlatching position when the control device is in the locked state. A control module is electrically connected to the control device. The control module sets the control device to be in the open state or the locked state. A far end wireless transmission module is electrically connected to the control module. A vibration detecting unit is mounted to one of the door and the control device and is electrically connected to the control module. The vibration detecting unit detects vibrations of door or control device. An image pick-up device is electrically connected to the control module and is configured to pick up an image of an outside of the door. The control module controls operation or non-operation of the image pick-up device. A manager mobile device is operable to connect with the control module to obtain management authority of access to the door. The manager mobile device includes a manager processor, a first wireless transmission module electrically connected to the manager processor, and a display electrically connected to the manager processor. The first wireless transmission module is connectable with the far end wireless transmission module. When the latch is in the latching position and when the door is in the closed position, the door is not permitted to move from the closed position to the open position. When the latch is in the unlatching position and when the door is in the closed position, the door is permitted to move from the closed position to the open position. When the control device is set to be in the locked state and when the vibration detects no vibrations of the door and the control device, the image pick-up device is not activated by the control module. When the control device is set to be in the open state, the image pick-up device is activated by the control module. When the control device is set to be in the locked state and when the vibration detecting unit detects vibrations of the door or the control device, the image pick-up device is activated by the control module to pick up an image of the outside of the door, the image of the outside of the door is sent to the manager mobile device, and the display of the manager mobile device displays the image of the outside of the door.

The control system can further include a sound pick-up device electrically connected to the control module and configured to pick up sounds outside the door. The control module controls operation or non-operation of the sound pick-up device. A broadcasting device is electrically connected to the control module and is configured to broadcast sounds to the outside of the door. The control module controls operation or non-operation of the broadcasting device. An image display device is electrically connected to the control module and is configured to display an image. The control module controls operation or non-operation of the image display device. The manager mobile device further includes a manager voice input device electrically connected to the manager processor and configured to receive a voice of the manager. The manager mobile device further includes a manager image input device electrically connected to the manager processor and configured to receive an image of the manager. The manager mobile device further includes speaker electrically connected to the manager processor and configured to broadcast the sounds received from the broadcasting device. In a case that the image of the outside of the door is not sent to the manager mobile device, the manager voice input device, the manager image input device, the display, and the speaker are not activated by the manager processor. In another case that the image of the outside of the door is sent to the manager mobile device, the manager processor controls the manager voice input device and the manager image input device to pick up the image and the voice of the manager and sends the image and the voice of the manager to the broadcasting device and the image display device to respectively broadcast the voice and the image of the manager, and the manager processor controls the display and the speaker to respectively display and broadcast the image obtained from the image pick-up device and the sounds obtained from the sound pick-up device.

The image display device can be a projector mounted on an outer side of the door. The projector is configured to project the image of the manager to the outer side of the door.

The control system can further include an electric bell electrically connected to the control module. If the control device is set to be in the locked state, when the electric bell is pressed, the control module activates the image pick-up device, and the image of the outside of the door is transmitted to the manager mobile device and is displayed by the display. If the control device is set to be in the open state, when the electric bell is pressed, the control module does not send the image of the outside of the door to the manager mobile device and does not activate the image pick-up device.

The control system can further include a near end wireless transmission module electrically connected to the control module and a passer access device granted with access authority of the door and including a passer wireless transmission module connectable with the near end wire transmission module. When the passer access device is located in a communication range of the near end wireless transmission module, the control module sets the control device to be in the open state, permitting the door to move from the closed position to the open position. When the passer access device is located outside of the communication range of the near end wireless transmission module, the control module sets the control device to be in the locked state, not permitting the door to move from the closed position to the open position.

The control system can further include a main memory electrically connected to the control module. A manager comparison identification information of the manager mobile device is stored in the main memory. The manager mobile device can further include an identification information input device electrically connected to the manager processor. In a case that the image of the outside of the door is not sent to the manager mobile device, the identification information input device is not activated by the manager processor. In another case that the image of the outside of the door is sent to the manager mobile device, the identification information input device is activated by the manager processor to permit the manger to input a manger real-time identification information, the control module compares the manager real-time identification information with the manager comparison identification information. If the manager real-time identification information matches with the manager comparison identification information, the control module sets the control device to be in the open state permitting opening of the door. If the manager real-time identification information does not match with the manager comparison identification information, the control device remains in the locked state not permitting opening of the door.

The control system can further include a timer unit electrically connected to the control module and set with a time allowance. The control device can further include a lock core operable by a key to switch the control device from the locked state to the open state. When vibrations have been detected by the vibration detecting unit, the timer unit starts to countdown the time allowance. The control device switches from the locked state to the open state during the time allowance, such that the control module does not activate the image pick-up device and does not send the image of the outside of the door to the manager mobile device. The control device switches back to the locked state after the time allowance, and the control module activates the image pick-up device and sends the image of the outside of the door to the manager mobile device.

In an example, the time allowance of the timer unit is in a range of 3-10 seconds. Illustrative embodiments will become clearer in light of the following detailed description described in connection with the drawing.

DETAILED DESCRIPTION

Figure 1:
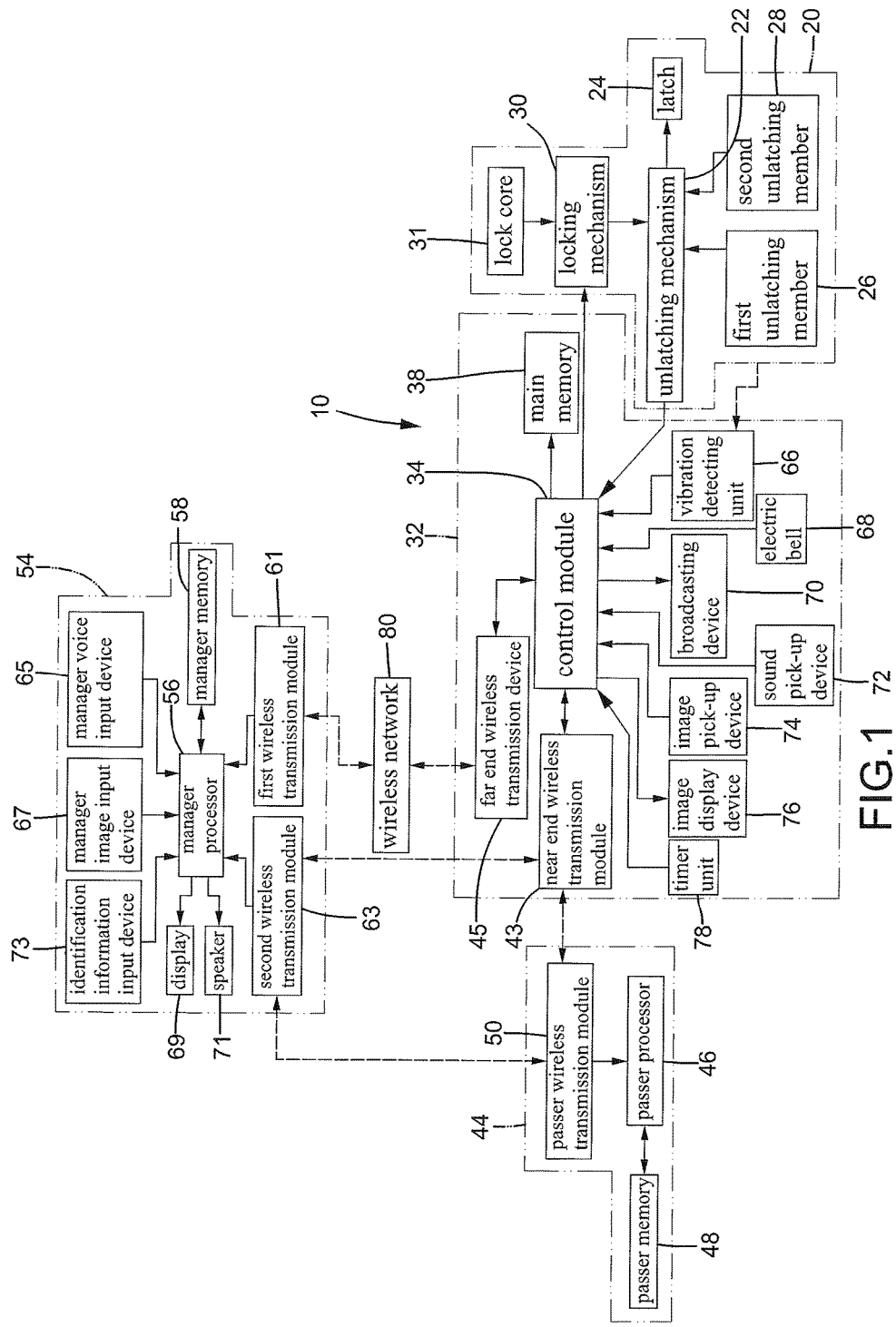
FIG. 1 is a diagrammatic block diagram of a control system according to the present invention.
Figure 2:
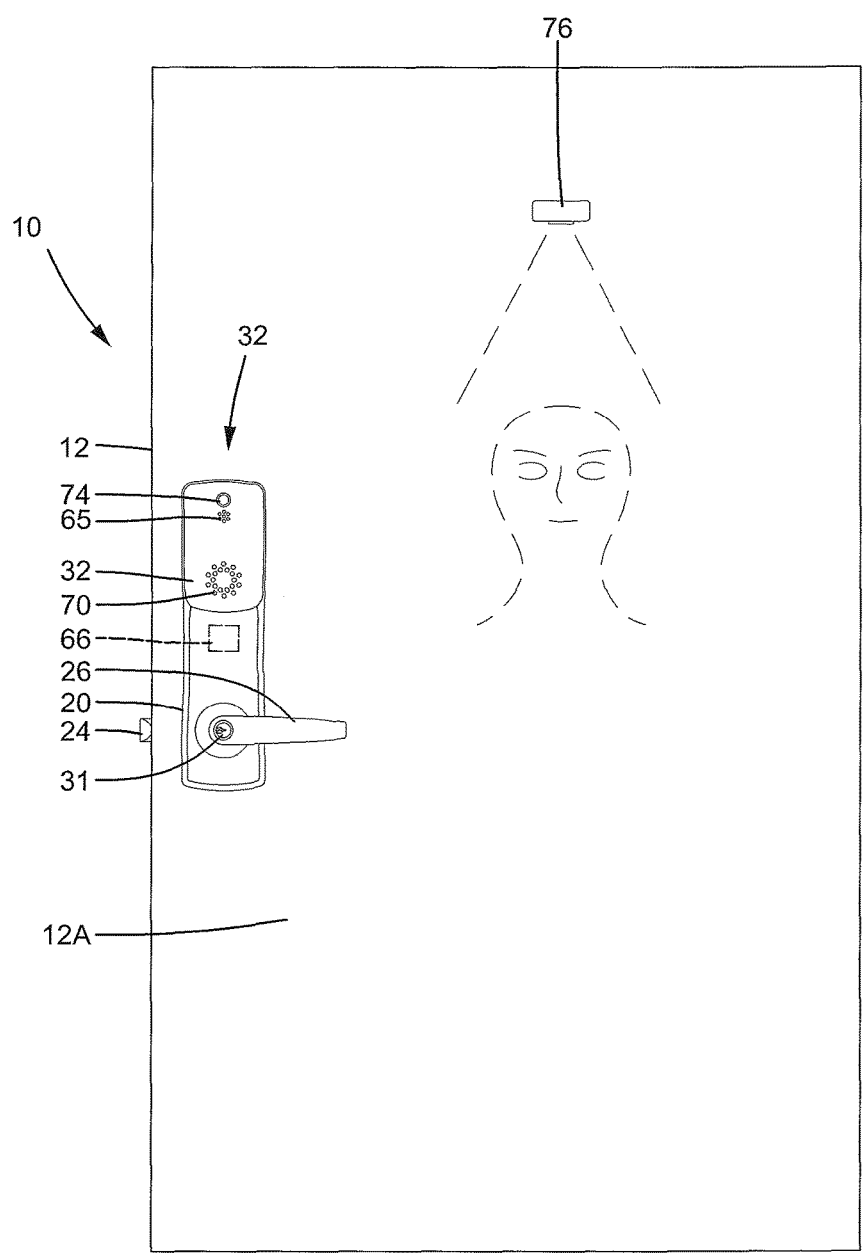
FIG. 2 is diagrammatic view illustrating a door equipped with the control system of FIG. 1.

With reference to FIGS. 1 and 2, a control system 10 according to the present invention includes a control device 20 mounted to a door 12, a controller 32 mounted to the door 12, a plurality of passer access devices 44 connectable with the controller 32, and a manager mobile device 54. Door 12 includes an outer side 12A and is movable between a closed position and an open position.

Control device 20 is a lock mounted on door 12 and includes a locking mechanism 30, an unlatching mechanism 22 operably connected to the locking mechanism 30, a latch 24 operably connected to the unlatching mechanism 22, and first and second unlatching members 26 and 28 operably connected to unlatching mechanism 22. Each of first and second unlatching members 26 and 28 can be a rotatable handle. Control device 20 further includes a lock core 31 operably connected to locking mechanism 30 that can be electrically controlled to be in a locking state or an unlocking state. Furthermore, a key can be inserted into the lock core 31 to actuate locking mechanism 30 from the locking state to the unlocking state. When locking mechanism 30 is in the unlocking state, operation of first unlatching member 26 or second unlatching member 28 to move latch 24 from a latching position outside door 12 to an unlatching position inside door 12 is permitted. On the other hand, when locking mechanism 30 is in the locking state, operation of first unlatching member 26 and second unlatching member 28 to move latch 24 from the latching position outside door 12 to the unlatching position inside door 12 is not permitted, and control device 20 is set to be in a locked state. When locking mechanism 30 is controlled to be in the unlocking state, movement of latch 24 from the latching position to the unlatching position is permitted, and control device 20 is set to be in an open state. When latch 24 is in the latching position, movement of door 12 from the closed position to the open position is not permitted. When latch 24 is in the unlatching position, movement of door 12 from the closed position to the open position is permitted.

Controller 32 includes a control module 34 electrically connected to locking mechanism 30 and a main memory 38 electrically connected to control module 34. Controller 32 further includes a near end wireless transmission device 43 electrically connected to control module 34, a far end wireless transmission device 45, a vibration detecting unit 66, an electric bell 68, a broadcasting device 70, a sound pick-up device 72, an audio pick-up device 74, an image display device 76, and a timer unit 78. Vibration detecting unit 66 is mounted to control device 20 or door 12. When door 12 or control device 20 vibrates, vibration detecting unit 66 outputs a vibration signal to control module 34. Timer unit 78 is set with a time allowance and cooperates with vibration detecting unit 66 to generate a countdown function. The time allowance can be 3-10 seconds. Image display device 76 can be a screen or a projector. When image display device 76 is a screen, the screen can be mounted to outer side 12A of door 12. When image display device 76 is a projector, the projector can be mounted to controller 32 or outer side 12A of door 12 and can directly project the image onto outer side 12A of door 12 (FIG. 2).

Each passer access device 44 can be a cell phone, a wearable device (such as smartglasses or a smartwatch), a tablet, a notebook, a radio frequency identification (RFID) card, an integrated circuit (IC) card, or a smart card. Each passer access device 44 includes a passer processor 46, a passer memory 48 electrically connected to passer processor 46, and a passer wireless transmission module 50 electrically connected to passer processor 46. Passer identification information is stored in passer memory 48. Each passer access device 44 is connected to near end wireless transmission module 43 of controller 32 via passer wireless transmission module 50.

Manager mobile device 54 can be a cell phone, a wearable device (such as smartglasses or a smartwatch), a tablet, or a notebook. Manager mobile device 54 includes a manager processor 56, a manager memory 58 electrically connected to manager processor 56, a first wireless transmission module 61 electrically connected to manager processor 56, a second wireless transmission module 63 electrically connected to manager processor 56, and an identification information input device 73 electrically connected to manager processor 56.

Manager mobile device 54 further includes a manager voice input device 65 electrically connected to manager processor 56 and a manager image input device 67 electrically connected to manager processor 56. Manager voice input device 65 can be a microphone for receiving the voice of a manager. Manager image input device 67 can be an image pick-up device for receiving the image of the manager. A management program is downloaded into and installed in manager mobile device 54. Execution of the management program permits first wireless transmission module 61 of manager mobile device 54 to connect with far end wireless transmission module 45 of controller 32 via a wireless network 80, or permits second wireless transmission module 63 of manager mobile device 54 to connect with near end wireless transmission module 43 of controller 32. Furthermore, manager mobile device 54 can connect with passer wireless transmission module 50 of each passer access device 44 via second wireless transmission module 63. Wireless network 80 can be the Internet, a mobile communication network (such as 3G or 4G mobile communication network), or a local area network.

Identification information input device 73 of manager mobile device 54 can be an image pick-up device, a microphone, a fingerprint input device, a finger vein recognition device, an iris recognition device, a touch screen, or a combination thereof. Execution of the management program permits use of identification information input device 73 to input a manager comparison identification information.

In a case that identification information input device 73 is an image pick-up device, a holder of manager mobile device 54 will be requested to use the image pick-up device to pick up the facial image of the holder of manager mobile device 54, and the characteristics of the facial image of the holder of manager mobile device 54 are encoded to be used as the manager comparison identification information.

In another case that identification information input device 73 is a microphone, the holder of manager mobile device 54 will be requested to use the microphone to pick up the voice of the holder of manager mobile device 54, and the voice of the holder of manager mobile device 54 is edited as a vocal print which is used as the manager comparison identification information.

In a further case that identification information input device 73 is a fingerprint input device, the holder of manager mobile device 54 will be requested to use the fingerprint input device to pick up the fingerprint of the holder of manager mobile device 54, and the characteristics of the fingerprint are encoded to be used as the manager comparison identification information.

In still another case that identification information input device 73 is a finger vein recognition device, the holder of manager mobile device 54 will be requested to use the finger vein recognition device to pick up the finger vein image of the holder of manager mobile device 54, and the characteristics of the finger vein image of the holder of manager mobile device 54 are encoded to be used as the manager comparison identification information.

In yet another example that identification information input device 73 is an iris recognition device, the holder of manager mobile device 54 will be requested to use the iris recognition device to pick up the iris image of the holder of manager mobile device 54, and the characteristics of the iris image of the holder of manager mobile device 54 are encoded to be used as the manager comparison identification information.

In still another example that identification information input device 73 is a touch screen, the holder of manager mobile device 54 will be requested to use the touch screen to input the pin number or the specific figure of the holder of manager mobile device 54, and the pin number or the specific figure of the holder of manager mobile device 54 is used as the manager comparison identification information.

The manager comparison identification information obtained is stored in main memory 38 of controller 32, and manager mobile device 54 obtains the management authority.

Now that the basic construction of control system 10 has been explained, the operation and some of the advantages of control system 10 can be set forth and appreciated. In particular, for the sake of explanation, it will be assumed that control system 10 is used for the first time. Locking mechanism 30 is preset in the locking state. Latch 24 is in the latching position and cannot be moved to the unlatching position. Thus, control device 20 is set to be in the locked state.

When manager mobile device 54 executes the management program for the first time, manager mobile device 54 uses the management program to connect with near end wireless transmission module 43 or far end wireless transmission module 45 of controller 32 via first wireless transmission device 61 or second wireless transmission device 63, and identification information input device 73 is used to pick up the manager identification information. The manager identification information is transmitted to controller 32 and is stored in main memory 38 to serve as the manager comparison identification information for obtaining the management authority.

Manager mobile device 54 can grant each passer access device 44 with the access authority to access door 12. Specifically, when manager mobile device 54 executes the management program, if at least one of passer access devices 44 is within the communication range of second wireless transverse module 63 of manager mobile device 54, manager mobile device 54 and the at least one of passer access devices 44 can be connected to each other via passer wireless transmission module 50 and second wireless transmission module 63.

Manager mobile device 54 is permitted to read a passer identification information of a user mobile device 44 connected to manager mobile device 54. The passer identification information is transmitted to and saved in main memory 38 of controller 32 and is used as passer comparison identification information. Thus, manager mobile device 54 can grant a plurality of passer access devices 44 with the access authority to open door 12.

When it is desired to use a passer access device 44 granted with the access authority to access door 12, the passer access device 44 is placed within the communication range of near end wireless transmission device 43 of controller 32. The passer access device 44 and controller 32 are connected to each other by passer wireless transmission module 50 and near end wireless transmission device 43. Thus, controller 32 can read the passer identification information in passer memory 48 of the passer access device 44.

After controller 32 has received the passer identification information, control module 34 compares the passer identification information with the passer comparison identification information stored in main memory 38. If the passer identification information matches with the passer comparison identification information stored in main memory 38, control module 34 sets locking mechanism 30 to be in the unlocking state, such that control device 20 is in the open state. Thus, first unlatching member 26 or second unlatching member 28 can be operated to move latch 24 from the latching position to the unlatching position, and door 12 can be moved from the closed position to the open position.

On the other hand, if the passer identification information does not match with the passer comparison identification information stored in main memory 38, control module 34 sets locking mechanism 30 to be in the locking state, such that control device 20 is in the locked state. Thus, operation of first unlatching member 26 or second unlatching member 28 cannot move latch 24 from the latching position to the unlatching position, and door 12 cannot be moved from the closed position to the open position.

If it is desired to use manager mobile device 54 to open the door, manager mobile device 54 is placed within the communication range of near end wireless transmission device 43 of controller 32. Manager mobile device 54 and controller 32 are connected by second wireless transmission module 63 and near end wireless transmission device 43. Controller 32 reads the manager comparison identification information stored in manager memory 58 of manager mobile device 54. Furthermore, controller 34 compares the manager identification information with the manager comparison identification information stored in main memory 38. If the manager identification information matches with the manager comparison identification information stored in main memory 38, control module 34 sets control device 20 to be in the open state, and the manager can use first latching member 26 or second latching member 28 to move latch 24 from the latching position to the unlatching position.

Vibration detecting unit 66 is used to detect whether door 12 or control device 20 vibrates. When control device 20 is set to be in the open state, using first or second unlatching member 26, 28 to move latch 24 from the latching position to the unlatching position can cause vibration of door 12 or control device 20, and detecting unit 66 can detect the vibration and send a vibration signal to control module 34. Since control device 20 is in the open state, control module 34 does not activate broadcasting device 70, sound pick-up device 72, image pick-up device 74, image display device 76, and timer unit 78 and does not actuate manager mobile device 54.

When control device 20 is set to be in the locked state, if vibration detecting unit 66 detects vibration of door 12 or control device 20, vibration detecting unit 66 sends a vibration signal to control module 34, and control module 34 activates timer unit 78 to start countdown of the time allowance. Control device 20 is switched to the open state during the time allowance, and control module 34 does not activate broadcasting device 70, sound pick-up device 72, image pick-up device 74, and image display device 76, and does not actuate manager mobile device 54.

Control device 20 is switched back to the locked state after the time allowance, control module 34 activates broadcasting device 70, sound pick-up device 72, image pick-up device 74, image display device 76, and timer unit 78 and actuates manager mobile device 54. Sound pick-up device 72 can pick up the sounds outside the door 12, and image pick-up device 74 can pick up the image of the outside of door 12. Controller 32 sends the sound and the image to manager mobile device 54, and the sound and image of the outside of door 12 are played and displayed through speaker 71 and display 69 of manager mobile device 54.

When a key is inserted into lock core 31 of control device 20 to switch locking mechanism 30 from the locking state to the unlocking state, vibration detecting unit 66 can detect vibration of control device 20 and sends a vibration signal to control module 34. Thus, timer unit 78 starts countdown of the time allowance. In an example, the time allowance is 3 seconds, which is long enough for a user to use a correct key to switch locking mechanism 30 from the locking state to the unlatching state. In this case control module 34 does not activate broadcasting device 70, sound pick-up device 72, image pick-up device 74, and image display device 76 and does not actuate manager mobile device 54.

If a burglar intends to destroy control device 20 and move door 12 from the closed position to the open position, vibration detecting unit 66 can detect vibrations resulting from destruction or compromise of control device 20 and can send a vibration signal to control module 34. Thus, timer unit 78 starts countdown of the time allowance. In this example, the time allowance is 3 seconds, which is not long enough for the burglar without the correct key, passer access devices 44, or manager mobile device 54 to destroy or compromise locking mechanism 30. Thus, control device 20 is in the locked state after the time allowance. Control module 34 activates broadcasting device 70, sound pick-up device 72, image pick-up device 74, and image display device 76. Furthermore, control module 34 actuates manager mobile device 54 by sending an actuating signal to first wireless transmission module 61, such that display 69, speaker 71, manager voice input device 65, manager image input device 67, and identification information input device 73 of manager mobile device 54 operate.

After manager mobile device 54 has been actuated, sound pick-up device 72 of controller 32 picks up the sounds at the outside of door 12, and image pick-up device 74 picks up the image of the outside of door 12. Controller 32 sends the sounds and the image to manager mobile device 54, and the sounds and the image at the outside of door 12 are played and displayed through speaker 71 and display 69 of manager mobile device 54. Thus, the manager can be aware of the real-time situation through manager mobile device 54, which is helpful for the manager in making the best decision (such as call the police).

After manager mobile device 54 has been actuated, manger voice input device 65 can pick up the voice of the manager, and manager image input device 67 can pick up the image of the manager. The voice and the image of the manager can be sent through first wireless transmission module 61 to controller 32. Broadcasting device 70 of controller 32 broadcasts the voice of the manager, and image display device 76 of controller 32 broadcasts the image of the manager. Through the mutual communication, the burglar will be notified that he or she is exposed, achieving a threatening effect.

If a friend or a family member of the manager pays a visit and presses the electric bell 68, control module 34 activates broadcasting device 70, sound pick-up device 72, image pick-up device 74, and image display device 76. Furthermore, control module 34 actuates manager mobile device 54 and transmits the voice and image received to manager mobile device 54 via far end wireless transmission module 45. Thus, the manager can have mutual communication with the friend or the family member via display 69, speaker 71, manager voice input device 65, manager image input device 67, broadcasting device 70, sound pick-up device 72, image pick-up device 74, and image display device 76.

If the manager permits the friend or the family member to access door 12, the manager uses identification information input device 73 to input a manger real-time identification information (not the manager identification information stored in manager memory 58). Manager mobile device 54 sends the manager real-time identification information through first wireless transmission module 61 to controller 32. Control module 34 compares the manager comparison identification information stored in main memory 38 with the manager real-time identification information received. If the manager comparison identification information stored in main memory 38 matches with the manager real-time identification information, control module 34 sets control device 20 to be in the open state, permitting the friend or the family to use first or second unlatching member 26, 28 to move latch 24 from the latching position to the unlatching position.

If the manager does not wish to let the friend or the family member to enter the house, the manager will not use identification information input device 73 to input the manager real-time information identification. In this case, control module 34 keeps control device 20 in the locked state, such that the friend or the family member cannot operate first or second unlatching member 26, 28 to move latch 24 from the latching position to the unlatching position.

Control system 10 uses vibration detecting unit 66 to detect vibrations of door 12 or control device 20 and uses image pick-up device 74 to pick up the image of the outside of door 12, such that the image of the outside of door 12 can be sent to the manager to permit the manager to judge whether a burglar is destroying door 12 or control device 20 by the real-time image.

Furthermore, control system 10 uses controller 32 including broadcasting device 70, sound pick-up device 72, and image display device 76 to cooperate with manager voice input device 65, manager image input device 67, display 69, and speaker 71 of manager mobile device 54, providing a remote communication function. With cooperation of identification information input device 73, the user is permitted to switch control device 20 from the locked state to the open state through remote operation even if the manager is far away from door 12. If the manager agrees, a visitor is permitted to move latch 24 from the latching position to the unlatching position by using first or second unlatching member 26, 28 of control device 20, further permitting opening of door 12.

It can be appreciated that lock core 31 can be directly coupled to latch 24 such that lock core 31 can be operated by a key to switch control device 20 from the locked state to the open state.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A control system comprising:
    a door movable between a closed position and an open position;
    a control device mounted to the door, with the control device including a latch, with the control device controllable to be in an open state or a locked state, wherein the latch is movable from a latching position to an unlatching position when the control device is in the open state, and wherein the latch is not movable from the latching position to the unlatching position when the control device is in the locked state;
    a control module electrically connected to the control device, with the control module setting the control device to be in the open state or the locked state;
    a far end wireless transmission module electrically connected to the control module;
    a vibration detecting unit mounted to one of the door and the control device and electrically connected to the control module, with the vibration detecting unit detecting vibrations of door or control device;
    an image pick-up device electrically connected to the control module and configured to pick up an image of an outside of the door, with the control module controlling operation or non-operation of the image pick-up device;
    a manager mobile device operable to connect with the control module to obtain management authority of access to the door, with the manager mobile device including a manager processor, a first wireless transmission module electrically connected to the manager processor, and a display electrically connected to the manager processor, and with the first wireless transmission module connectable with the far end wireless transmission module,
    with the latch in the latching position and with the door in the closed position, the door is not permitted to move from the closed position to the open position,
    with the latch in the unlatching position and with the door in the closed position, the door is permitted to move from the closed position to the open position,
    with the control device set to be in the locked state and with the vibration detecting no vibrations of the door and the control device, the image pick-up device is not activated by the control module,
    with the control device set to be in the open state, the image pick-up device is activated by the control module, and
    with the control device set to be in the locked state and with the vibration detection unit 66 detecting vibrations of the door or the control device, the image pick-up device is activated by the control module to pick up an image of the outside of the door, the image of the outside of the door is sent to the manager mobile device, and the display of the manager mobile device displays the image of the outside of the door.

2. The control system as claimed in claim 1, further comprising:
    a sound pick-up device electrically connected to the control module and configured to pick up sounds outside the door, with the control module controlling operation or non-operation of the sound pick-up device,
    a broadcasting device electrically connected to the control module and configured to broadcast sounds to the outside of the door, with the control module controlling operation or non-operation of the broadcasting device,
    an image display device electrically connected to the control module and configured to display an image, with the control module controlling operation or non-operation of the image display device, with the manager mobile device further including a manager voice input device electrically connected to the manager processor and configured to receive a voice of the manager, a manager image input device electrically connected to the manager processor and configured to receive an image of the manager, and a speaker electrically connected to the manager processor and configured to broadcast the sounds received from the broadcasting device, with the image of the outside of the door not sent to the manager mobile device, the manager voice input device, the manager image input device, the display, and the speaker are not activated by the manager processor, and with the image of the outside of the door sent to the manager mobile device, the manager processor controls the manager voice input device and the manager image input device to pick up the image and the voice of the manager and sends the image and the voice of the manager to the broadcasting device and the image display device to respectively broadcast the voice and the image of the manager, and the manager processor controls the display and the speaker to respectively display and broadcast the image obtained from the image pick-up device and the sounds obtained from the sound pick-up device.

3. The control system as claimed in claim 2, with the image display device being a projector mounted on an outer side of the door, and with the projector configured to project the image of the manager to the outer side of the door.

4. The control system as claimed in claim 1, further comprising:
an electric bell electrically connected to the control module,
with the control device set to be in the locked state, when the electric bell is pressed, the control module activates the image pick-up device, and the image of the outside of the door is transmitted to the manager mobile device and is displayed by the display, and
with the control device set to be in the open state, when the electric bell is pressed, the control module does not send the image of the outside of the door to the manager mobile device and does not activate the image pick-up device.

5. The control system as claimed in claim 1, further comprising:
a near end wireless transmission module electrically connected to the control module,
a passer access device granted with access authority of the door and including a passer wireless transmission module connectable with the near end wire transmission module,
with the passer access device located in a communication range of the near end wireless transmission module, the control module sets the control device to be in the open state, permitting the door to move from the closed position to the open position, and
with the passer access device located outside of the communication range of the near end wireless transmission module, the control module sets the control device to be in the locked state, not permitting the door to move from the closed position to the open position.

6. The control system as claimed in claim 1, further comprising:

a main memory electrically connected to the control module, with a manager comparison identification information of the manager mobile device stored in the main memory,
with the manager mobile device further including an identification information input device electrically connected to the manager processor,
with the image of the outside of the door not sent to the manager mobile device, the identification information input device is not activated by the manager processor,
with the image of the outside of the door sent to the manager mobile device, the identification information input device is activated by the manager processor to permit the manger to input a manger real-time identification information, the control module compares the manager real-time identification information with the manager comparison identification information, wherein when the manager real-time identification information matches with the manager comparison identification information, the control module sets the control device to be in the open state permitting opening of the door, and wherein when the manager real-time identification information does not match with the manager comparison identification information, the control device remains in the locked state not permitting opening of the door.

7. The control system as claimed in claim 4, further comprising:
a main memory electrically connected to the control module, with a manager comparison identification information of the manager mobile device stored in the main memory,
with the manager mobile device further including an identification information input device electrically connected to the manager processor,
with the image of the outside of the door sent to the manager mobile device, the identification information input device is not activated by the manager processor,
with the image of the outside of the door sent to the manager mobile device, the identification information input device is activated by the manager processor to permit the manger to input a manger real-time identification information, the control module compares the manager real-time identification information with the manager comparison identification information, wherein when the manager real-time identification information matches with the manager comparison identification information, the control module sets the control device to be in the open state permitting opening of the door, and wherein when the manager real-time identification information does not match with the manager comparison identification information, the control device remains in the locked state not permitting opening of the door.

8. The control system as claimed in claim 1, further comprising:
a timer unit electrically connected to the control module and set with a time allowance,
with the control device further including a lock core operable by a key to switch the control device from the locked state to the open state,
wherein when vibrations have been detected by the vibration detecting unit, the timer unit starts to countdown the time allowance,
wherein the control device switches from the locked state to the open state during the time allowance, the control module does not activate the image pick-up device and does not send the image of the outside of the door to the manager mobile device, and wherein the control device switches back to the locked state after the time allowance, the control module activates the image pick-up device and sends the image of the outside of the door to the manager mobile device.

9. The control system as claimed in claim 8, wherein the time allowance of the timer unit is in a range of 3-10 seconds.

* * * * *